Oct. 21, 1958  G. SCHICKEDANZ ET AL  2,856,743
CONVEYING SYSTEM
Filed Oct. 4, 1954  3 Sheets-Sheet 1
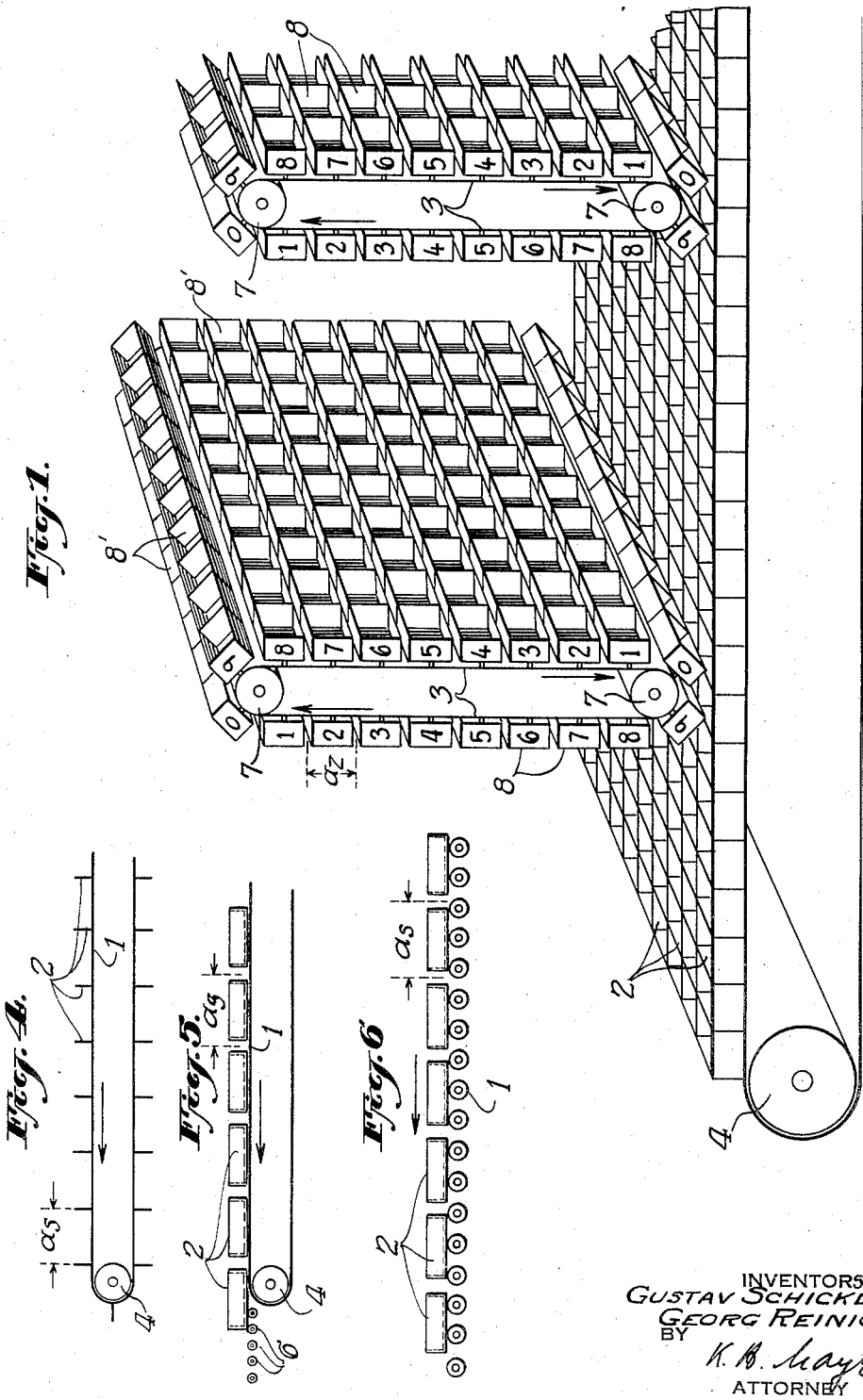
INVENTORS.
GUSTAV SCHICKDANZ.
GEORG REINICKE.
BY
K. B. Mayr.
ATTORNEY Oct. 21, 1958 G. SCHICKEDANZ ET AL 2,856,743
CONVEYING SYSTEM
Filed Oct. 4, 1954 3 Sheets-Sheet 2
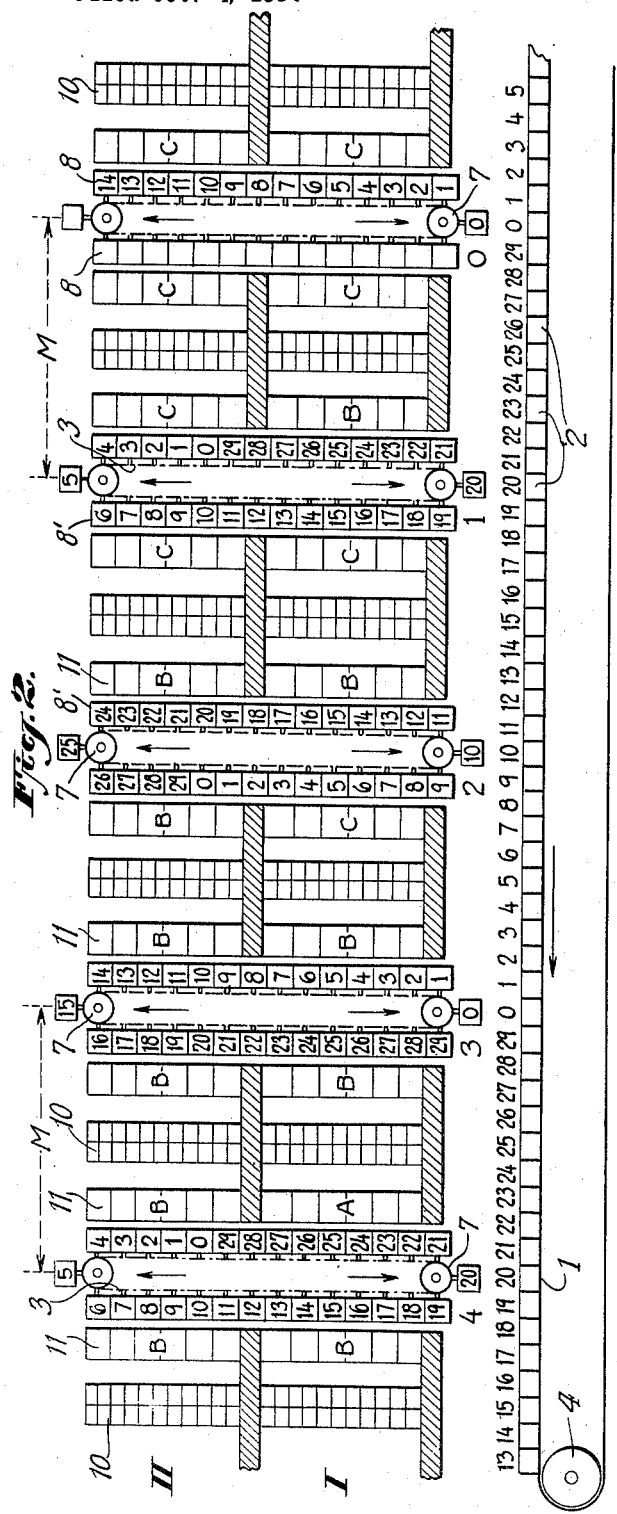
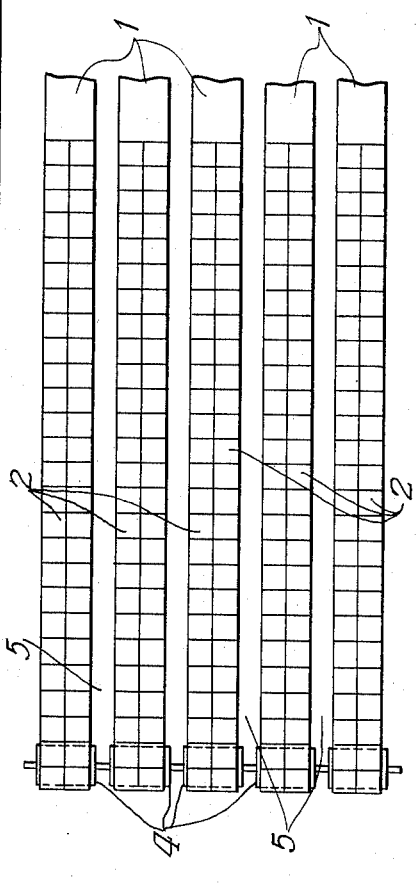
INVENTORS.
GUSTAV SCHICKEDANZ.
GEORG REINICKE.
BY
ATTORNEY INVENTORS
GUSTAV SCHICKEDANZ
GEORG REINICKE
BY K. H. Mayr
ATTORNEY

United States Patent Office 2,856,743
Patented Oct. 21, 1958

2,856,743

CONVEYING SYSTEM

Gustav Schickedanz, Furth, Bavaria, and Georg Reinicke, Gauting, near Munich, Germany Application October 4, 1954, Serial No. 460,178

Claims priority, application Germany October 5, 1953

11 Claims. (Cl. 53—246)

The present invention relates to a conveying plant for the gathering of collections of different kinds of goods, particularly of small articles, such as are stored in large mail-order houses, and which according to orders received and regardless of their varying kind and number have to be speedily, continuously mechanically collected from the different places where they are stored and assorted and prepared for being packed up in parcels.

The invention solves the problem of gathering the collections by providing the conveyor plant with a main conveying band which is completely covered with collecting receptacles, boxes, containers etc. of suitable size and shape and without any gaps between them, and to which by means of a plurality of suitably distributed additional or feeder conveyors operated at synchronous or asynchronous speed with the main conveying band the various lines of goods are continuously fed.

It will be seen that the principle on which the invention is based resembles somewhat a river to which the water is continuously supplied from all directions by tributories, whereby modification of the conveying system is possible within wide limits, so that adaption of the system to particular lines and numbers of goods, to a required efficiency, and to special localities is quite feasible.

Additional features and advantages of the invention will be understood from a consideration of the following detailed description taken in connection with the accompanying drawings, forming a part of this specification and in which an embodiment of the invention has been shown by way of example. However, we wish to say that the invention is not confined to any strict conformity with the showing of the drawings, but may be changed or modified, so long as such changes or modifications mark no material departure from the salient features of the invention as expressed in the appended claims.

In the drawings, in which like parts are referred to by the same reference numerals in all of the several figures, Fig. 1 is a diagrammatic view of a portion of the conveying plant;

Fig. 2 is a diagrammatic side elevation of a larger portion of the plant;

Fig. 3 is a diagrammatic top view of a constructional detail;

Figs. 4 to 6 are diagrammatic side views of constructional details;

Figure 7:
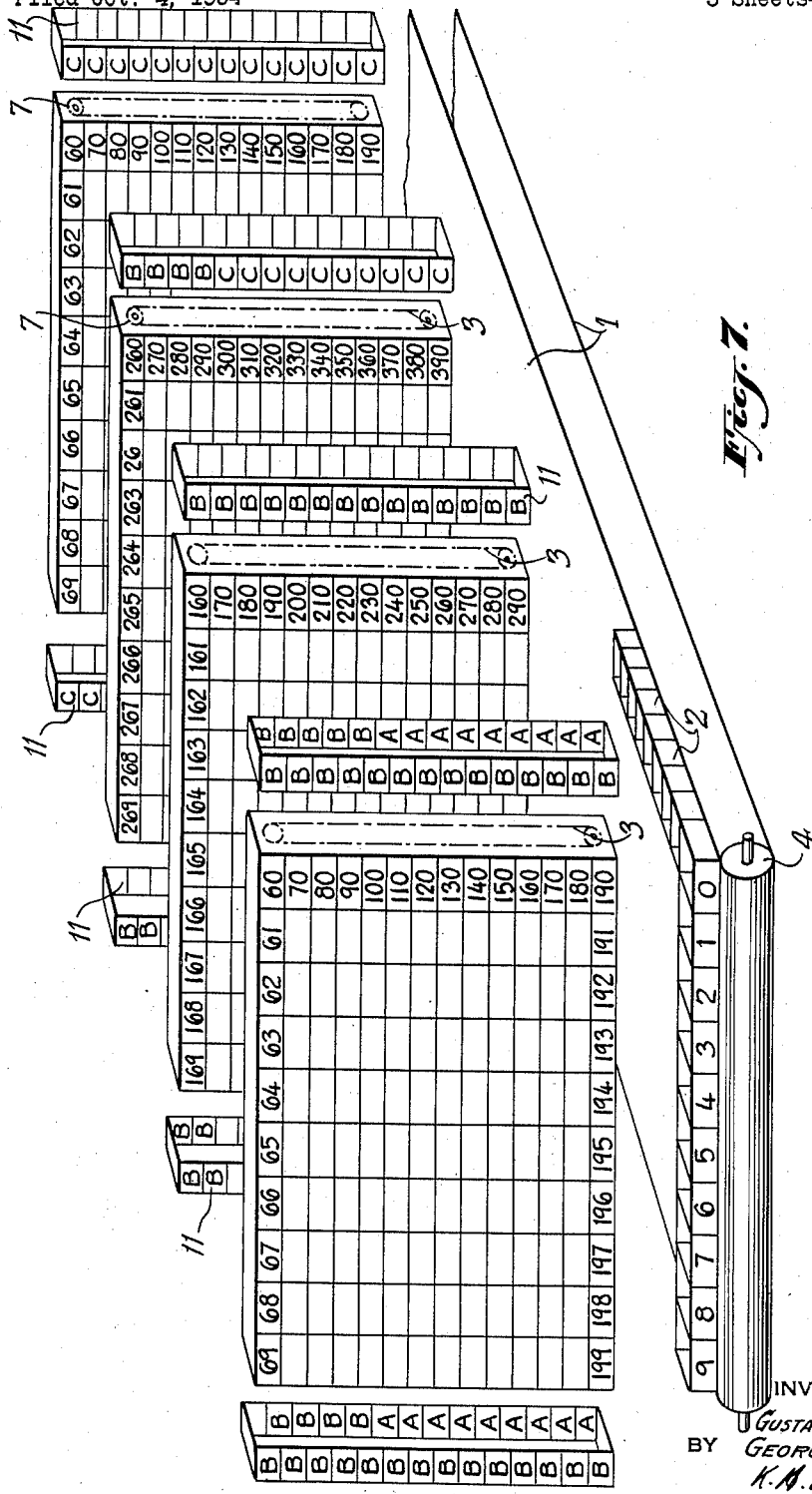
Fig. 7 is a diagrammatic perspective view of a portion of the plant and of the additional conveying or feeding arrangement.

The conveying plant consists chiefly of a main conveying device provided with the collecting receptacles 2, and of additional conveying devices 3. The main conveying device consists of rollers 4 and of an endless band 1 mounted on rollers and which in the embodiment illustrated in the drawings extends in horizontal direction, but which, if required, may also extend in an ascending or descending direction. The conveying band 1 is on its conveying section, that is to say, on the upper run of the band, completely occupied by collecting receptacles 2 which are arranged in predetermined numbers of ten beside one another in rows, so that a checker-board-like arrangement results (see Fig. 1). The size and shape of the receptacles depend upon the size and shape of the goods to be handled. In most cases quadrangular open boxes of, for example, 100$\phi$ cm. length, 75$\phi$ cm. width, and 40$\phi$ cm. height will be satisfactory. The receptacles are loosely supported on the conveying band 1, so that they can without difficulty be removed from the conveying band at one end of the conveying path, and, after emptying, again be placed on the conveying band at the other end of the latter, whereby the conveying device may be, according to requirements, 100 and more meters long, and whereby the band has to be provided with conventional projections or other stops securing the receptacles in accurate position and alinement during their conveyance on the band. It is also possible to fasten the receptacles 2 on the band 1 by means of screws or the like, in which case the receptacles can not be removed from the band, but constantly have to travel on the band around the rolls 4. After the receptacles have been emptied by hand or mechanically, the goods can be packed up in parcels and dispatched to the customers.

In the modification of Fig. 3, the main conveying device does not consist of one single band 1 of required width, as shown in Fig. 1, but of five bands arranged beside one another and provided each with two rows of receptacles. Provided between the five bands are pathways 5 enabling inspection, removal, and rearrangement of the receptacles 2.

Figs. 4 to 6 show three examples of combinations of conveying bands and receptacles. In the form of construction of Fig. 4, the receptacles 2 are rigidly secured to the conveying band 1 and travel together with it around the rollers 4. In the form of construction of Fig. 5, the receptacles 2 are loosely arranged on the band 1 and are, at the end of the band, removed from the band or passed on for further conveyance to a roller path 6. In the form of construction of Fig. 6, the conveying band 1 has been omitted entirely, and a roller path 1 has taken its place, which roller path is provided with means for its mechanical actuation in per se known manner. Here, too, the receptacles are loosely arranged on the rollers. The arrows indicate the direction of motion.

With the main conveying band 1 cooperate the additional conveying devices 3. Each of the additional conveying devices consists (see Figs. 1 and 2) likewise of one single endless band 3, or of a plurality of bands 3, mounted on rollers 7 and provided with holding means 8 for the goods taken from the stock in conformity with the orders received. The bands 3 may consist of belts, chains, roller-type chains or the like, and the rollers 7 are adapted in their construction to the particular type of conveying band employed, and for that reason may be sprocket wheels, circular rollers or prismatic rollers etc.

The holding means 8 are likewise adapted to the type of goods to be conveyed and may consist of boxes (as shown in Fig. 1), or of holding pins, or wire receptacles, out of which the goods can either automatically slip by gravity, or from which the goods are mechanically released at a given moment. The holding means 8 are fastened, without any gaps between them, in rows beside one another and above one another on their conveying bands, whereby the number of the holding means positioned beside one another corresponds to the number of the receptacles 2 positioned beside one another on the band 1. The additional conveying devices 3 are arranged vertically above the main conveying device 1 and suitably spaced apart, so that the construction results which has been illustrated in Figs. 1 and 2. The number of the additional conveying devices 3 depends upon the size and capacity of the entire plant. Although in Figs. 1 and 2 the additional conveying devices are positioned vertically above the main conveying band 1, an arrangement like this is not absolutely necessary. The additional conveying devices may also extend in a direction inclined toward the path of the main conveying device 1 and parallel to one another. Or every additional conveying device may extend in a differently inclined direction toward the main conveying device 1. The length of the additional conveying devices depends likewise upon the particular type of plant employed, so that the construction may be such that the additional conveying devices extend through several stories of the warehouse. From an inspection of the embodiment shown in Fig. 2 it will be seen that the main conveying device 1 is accommodated in the basement of the building, while the additional conveying devices extend through the first and second story of the latter.

An absolute necessity for the orderly functioning of the conveyance of the goods is that the holding means 8 in their lower reversing positions not only correctly empty their goods into the receptacles 2 of the main conveying device passing beneath the additional conveying devices, but that the holding means 8 deliver all of the different kinds of goods of one order into the collecting box 2 intended to receive all of the goods of that order. That is why the main conveying device 1 and all of its additional conveying devices are synchronically driven, and why the feeding of the goods into the additional conveying devices is effected according to a periodically repeated numerical order which will hereinafter be described.

The result to be achieved—for a plant consisting of, for instance, one main conveying device and a plurality of additional conveying devices—is that the goods placed upon certain predetermined holding means 8 of the additional conveying devices 3 are fed at successive intervals of time into certain collecting receptacles 2 of the main conveying device 1, and that in this way the goods delivered by the different additional conveying devices 3 are gathered to form certain collections of goods in conformity with the orders received, whereby the goods required for the individual orders may be of the most different kind.

Every compartment or holding contrivance 8 of the continuously moving additional conveying devices attends to a certain section of the main conveying band 1; and every compartment always cooperates with the same receptacle of the main conveying band if the latter during a rotation of the additional conveying band likewise performs a complete rotation. If, however, as practically always is the case, the conveying band of the main conveying device is longer than that of the additional conveying devices, then the number of receptacles attended to by every compartment of the additional conveying devices during one rotation of the main conveying band corresponds to the number of revolutions which the additional conveying bands—because of their shorter length—are enabled to perform during one rotation of the main conveying band, whereby the plurality of receptacles of the main conveying band attended to by every compartment of the additional conveying bands are positioned at uniform distances from one another. In every case, the main conveying band and the additional conveying bands are operated, with the aid of per se known electric or mechanical means, at such relative speeds that the compartments of the additional conveying bands always empty into the receptacles of the main conveying band in which the goods of the respective compartment of the parallel additional conveying bands are to be collected. The result is that, after the main conveying band has passed underneath the last one of the additional conveying bands, there have collected in the individual collecting receptacles of the main conveying band each time all of the goods of one collection or order in one receptacle. It will be seen, therefore, that the additional conveying bands do not only serve as transporting means, but also as a preliminary classifying means. After the orders received from the customers have been provided with classifying numbers corresponding to classifying numbers provided at the receptacles of the main conveying band and at the compartments of the additional conveying bands, the goods are placed into the respective compartments of the additional conveying bands, whereby the procedure is such that into the holding means 8 of every additional conveying device are placed those goods which are stored up on shelves or otherwise in the vicinity of the respective additional conveying band. In this way the additional conveying bands serve as preliminary classifying means, while the main conveying band serves as final classifying means. It is understood that in complicated cases a further subdivision is possible, for instance in such a way that between the preliminary classifying means and the final classifying means intermediate classifying means are interposed.

The work of the employees attending to the additional conveying bands consists in placing into the slowly passing holding means of the feeder conveyor designated by the classifying number marked on the order sheet or specification the objects which are to be packed up in parcels or the like. In this way the appertaining receptacle of the main conveying band is gradually filled up by the several additional conveying devices with all of the goods forming a part of the respective order, and after the main conveying band has passed underneath the last one of the additional conveying bands, all of the articles of the order are completely gathered and can be packed up for dispatch to the customer. It is understood that many of the holding means 8 of the additional conveying means will not be filled up with goods. When no goods of the stock, to which the respective additional conveying means attend, have been ordered, the compartment provided with the classifying number of the order will remain unoccupied.

It is advisable to use in the plant a classifying order based on the decimal system. In a plant of this kind, there are arranged on every main conveying band ten receptacles beside one another, and ten rows of this kind form a hundred group. These hundred units of the main conveying band have the classifying numbers 0–99 and take care of 100 parcels to be gathered. As additional conveying bands may be employed devices provided with 200 compartments. These additional conveying bands which, as already mentioned, serve as preliminary classifying means, have their compartments travel in an endless row in vertical direction slowly from below to the top on one of their sides with the other rows following in numerical order, while at the upper end of the additional conveying device the rows pass over to the opposite side of the additional conveying device. The rows are thereupon charged on the other side of the additional conveying device with the goods stored on that side. Because of suitably devised guiding means, the additional conveying device does not discharge its goods at the upper end onto the main conveying band, but exclusively at the lower end.

The construction of the holding means of the additional conveying devices depends upon the type and size of the goods to be handled. At all events the holding means must be so devised that they can be easily charged with the goods by the employees. When several additional conveying bands are employed, the rows of compartments 0–9 of the next following additional conveying band will travel after a predetermined interval of time likewise past the main conveying band, whereby the rows 0–9 discharge their contents into the same receptacles, so that after the main conveying band has passed all of the additional conveying bands and appertaining storing places, all of the goods of the order numbers 0–9 will be present in the respective receptacles and be ready for being packed up in parcels or the like.

When the construction of the conveying plant is based on the decimal system, and when the additional conveying bands are devised and dimensioned as hereinbefore described, there will be on each of the two sides of the additional conveying devices hundred compartments or holding contrivances to be attended to. When, therefore, the main conveying band is provided with 5000 units (receptacles), each side of an additional conveying band will have to work 25 times before the starting row 0 (first collection, appertaining to row 0-9) of the main conveying band reappears. It is necessary to indicate to the employees attending to the charging of an additional conveying device which hundred-group is travelling past the additional conveying device. For, the main conveying band (located beneath the floor, in the basement) is usually not visible to the attendants, and frequently not provided with marks in such a way that every row has its classifying number. This information about the hundred-group which is travelling past may be transmitted to the attendants by means of suitable conventional signals. If there are to be gathered in a business in one day for instance 10,000 collections (parcels), the complete field 0-99 will have to travel past every additional conveying band 100 times. After this field has passed the first time, the number 100 may flash up, indicating to the attendants of the additional conveying device that now the numbers 100-199 (the second hundred of the parcels) have to be charged. The employees charge the additional conveying device according to order sheets or specifications on which the classifying numbers (0-9999) are marked, for the second hundred therefore the classifying numbers 100 to 199. They have to be sure, therefore, which hundred-group or hundred-field is passing. The additional conveying device in its turn may be provided with marks regarding its two hundred-fields. It is possible also that the additional conveying device is charged with the goods in two or more stories (see Fig. 2), so that its compartments on either side travel past two or more stocks of different types of goods. The inventive idea, that every compartment of the additional conveying device delivers to an appertaining receptacle of the main conveying device, is thereby not changed.

In order to enable the employees to feed the goods quickly and efficiently into the additional conveying devices, the invention proposes to arrange the different kinds of goods in clearly identified separate compartments of the shelves 10 (see Figs. 2 and 7) and to work out card indexes providing every article with a special identifying number. These identifying numbers indicate the shelf and the compartment of the latter in which the article in question is stored up. In addition to this the index cards give information about the quantity of every article stored in the shelves. If the identification is carried so far in the index cards or goods-cheques that every article in the shelves is represented by a special goods-cheque, for instance a handkerchief of a certain kind and size—by a cheque, or a pair of shoes of a certain kind and size—by a cheque, then the execution of incoming orders can be prepared by means of the aforesaid goods-cheques in such a way that the respective goods-cheques are taken from the card-index boxes and added to the orders. These cheques, representative of the respective goods, are then marked with the respective order numbers and sent at certain times of the day to the respective storing places, so that the goods can be taken from the shelves and kept in readiness for being fed into the additional conveyers.

The additional conveying devices and the main conveying device have to be operated in harmony with each other, and this operation must be based on a system which will hereinafter be described in detail.

Fig. 1 shows an additional conveying device provided with two groups of containers. Every group consists of ten holding contrivances 8, numbered 0 to 9. The number of the containers or other types of holding contrivances per additional conveying device is $N = \alpha \cdot n$. Whereby $n$ is the number of the holding contrivances per group and the radix of the system, while $\alpha$ is the number of the groups. If, furthermore, the distance of the individual goods holding means from one another is denoted by $a_z$, then the length of the endless chain 3 is $L = \alpha \cdot n \cdot a_z$. In the illustrated embodiment $n$ is equal to 10 (numbered from 0 to 9) and $\alpha$ equal to 2. It would also be possible to fix for this example $\alpha = 1$ and $n = 20$ (numbered from 0 to 19)

or for another example $\alpha = 3$ and $n = 10$, or $\alpha = 1$ and $n = 30$

The number (Z) of the additional conveying devices arranged behind one another is unlimited and depends upon the number of shelves 10 required for the storing of the goods. The number Z may for instance be assumed to be 10 (whereby these again will be numbered from 0 to 9).

The main conveyor cooperates with and forms the collecting means for all of the feeder conveyors. The main conveyor consists of a series of collecting receptacles which are moved at constant speed ($v_s$) and at uniform distances ($\alpha_s$) from one another. All of the feeder conveyors move at the speed $v_z$. $v_z$ designates hereinafter the speed of the main conveying device. The following requirement has to be fulfilled $$\frac{v_z}{v_s} = \frac{a_z}{a_s} \text{ or } v_z = \frac{a_z}{a_s} \cdot v_s$$

The value of $\alpha$ depends in practical use upon the value of $a_z$. It is necessary that for the employees the easy charging of the compartments is ensured, unless also the charging of the compartments is effected in a mechanical way.

As already mentioned, there are arranged between the individual additional conveying devices stationary storing shelves 10 from which the additional conveying devices are charged with goods according to goods-cheques provided with index numbers. As the compartments in the shelves in which the goods are stored must be of a convenient length and be positioned at a convenient height, and as for this reason the number of the compartments is a limited one, it is obvious that a plurality of shelves and, consequently, also a plurality of additional conveying devices are necessary. That is why the number of additional conveying devices needed depends chiefly upon the variety of different articles carried by the firm.

The additional conveying devices positioned above the main conveying device are arranged at certain distances (M) from one another. Applicable to this is the equation $M = n_s \cdot a_s = \beta \cdot n \cdot a_s$. Whereby $n_s$ is the number of the fields or receptacles (generally speaking the "charging elements") on the main conveying band between two additional conveying devices. Applicable is further $n = \beta \cdot n$, whereby $n$ is the radix of the system and $\beta$ a coefficient defining the ratio of the number of the collecting receptacles 2 positioned on the main conveying band between two additional conveying bands to the radix of the system $n$. When $\beta$ is $= 1$, then $n_s$ is $= n$, which means that the number of collecting receptacles positioned between two additional conveying devices on the main conveying band is equal to the number of holding contrivances at the additional conveying device per group, that is to say, equal to the radix of the system.

The successively arranged additional conveying devices serve the purpose of emptying their individual compartments (holding contrivances) into the collecting receptacles of the main conveying device passing beneath them in such a way that always the same receptacles, for instance No. 0 (see Fig. 2), are charged or filled up by the appertaining compartments No. 0 of the additional conveying devices. In this way is effected the gathering of the initially subdivided orders upon the main conveying band. To achieve this, a certain displacement of the phases of the individual additional conveying devices is necessary (see Fig. 3). Applicable to this is the equation $\phi = \epsilon \cdot \beta \cdot n \cdot \alpha_2$. The coefficient $\epsilon$ is a value coordinated to the appertaining additional conveying device.

The meaning of the coefficient $\beta$ has already been explained above. In Fig. 2 the radix of the system is, for instance, $n=30$ and $\beta=\frac{1}{3}$. The number of the receptacles on the main conveying band between two additional conveying bands is therefore 10. The phase displacement $\varphi$ for Fig. 2 is, consequently, as follows:

For additional conveying device $0=0$, that is to say, starting value;
For additional conveying device $1=\frac{1}{3} \cdot n \cdot a_z = 10 \cdot a_z$;
For additional conveying device $2=\frac{2}{3} \cdot n \cdot a_z = 20 \cdot a_z$;
For additional conveying device $3=\frac{3}{3} \cdot n \cdot a_z = 30 \cdot a_z$;
For additional conveying device $4=\frac{4}{3} \cdot n \cdot a_z = 40 \cdot a_z$.

It may further be mentioned that the value of $\beta$ within the plant may vary, that is to say, that the distance M from additional conveyer to additional conveyer may vary.

Fig. 2 shows five additional conveyers above a main conveying band. Each of the additional conveyers has 30 containers or holding contrivances. Consequently is $n=30$, and, as only one group of containers exists, is $\alpha=1$. If the additional conveyers extended through several stories, as shown in Fig. 2, then a corresponding lengthening of the additional conveyers or a corresponding reduction of $n$ would permit a selection of $\alpha=1$, 2 or 3.

The additional conveyor 0 empties in Fig. 2 into the receptacle No. 0 of the order group C on the main conveying band. The additional conveyer 1 empties its compartment No. 20 into the receptacle No. 20 of the order group B on the main conveying band. The additional conveyer 3 empties its compartment No. 0 into the receptacle No. 0 of the order group B. The additional conveyor 4 empties its compartment No. 20 into the receptacle No. 20 of the order group A.

From an inspection of Fig. 2 it will be seen that, when the forward movement of the main conveying band continues, for instance the container 0 of the additional conveyer 1 empties after some time into the receptacle No. 0 of the main conveying band for order group C, and that the container No. 0 of the additional conveyor 2 after some time empties into the same receptacle No. 0 of the order group C on the main conveying band. An inspection of the additional conveyer 4 shows that the compartments 20 to 29 still charge the corresponding receptacles on the main conveying band of the order group A, while the then following containers 0 to 19 already charge the corresponding receptacles on the main conveying band of the order group B. While the compartments of the additional conveyers may be definitely numbered, for instance from 0 to 29, the order groups A, B, C (which also may be identified by numbers or otherwise) will, owing to forward movement of the main conveying band, continuously change.

As a rule, the following will result. If the radix $n$ of the system is selected for instance at 30 (as in Fig. 4), then numbered orders (for instance from 0 to 29) can continuously be completed. After this the numbering of the orders has to be started afresh. This can be easily achieved by means of distinguishing numbers, such as A/0—29, B/0—29 etc.

It is, however, important that these distinguishing numbers, which indicate the momentary state of operation and which are changing in conformity with the forward movement of the main conveying band, are marked at the additional conveyers. This may be effected by means of lighted plates which continuously cause these letters or numbers to flash up. This marking system of the tabulators 11 is diagrammatically illustrated in Figs. 2 and 7, and the progressing illumination of these distinguishing numbers may be effected in simple manner by means of control cylinders which at proper transmission ratio open and close contacts driven from the additional conveyers and thus cause the appertaining distinguishing numbers to flash up.

Fig. 7 is a perspective view of the arrangement shown already in Fig. 2, so that the parallel systems are clearly recognizable. The main conveying band 1 is again provided with rows of ten. On the right and left side of the additional conveyers are diagrammatically indicated the tabulators 11.

It is frequently desirable to distribute the goods to be accumulated in the receptacles of the main conveying device, and which are going to form the contents of a parcel, over the entire area of the receptacle. According to the invention this may be accomplished through suitable displacement of the center lines of the additional conveyers with respect to the calculated value M. In this way an undesired accumulation of the collection at one place of the respective receptacle or collecting means of the main conveying device will be avoided. The same result can be achieved when the value $\varphi$ is given a certain lead or retardation (lag in phase), or when through suitable rocking of the main conveying band or the collecting receptacles the goods positioned in the center of the receptacles are distributed over the entire interior of the latter, provided of course that the goods can endure the rocking or shaking.

All of the additional conveyers must run at uniform speed, and the rotation of the main conveying band must be timed to that of the additional conveyers. In order to adapt the efficiency of the plant to the feed-ways and to the time required for charging the compartments of the additional conveyers with the goods, it is advisable to devise the entire plant for infinitely variable speed transmission, while simultaneously the relative ratios of the speeds are maintained.

The plant may work in a continuous way, or the actuation may be an intermitent or sinuous one etc.

In order to provide the employees attending to the charging of the individual additional conveyers with the necessary instructions, the invention suggests to inform the employees through slips of paper provided with the respective index numbers early enough before the respective receptacles of the main conveying band are passing which goods have to be placed into the respective compartments of the additional conveyers. For this purpose the invention proposes the use of tickets or other pieces of paper which are specially printed for every article or for certain groups of goods and which indicate by means of a further identification mark the collection (index number) to which the respective article appertains. When, therefore, an order has to be carried out for instance: two plug sockets, one penholder, and one handkerchief, then one index-card each provided, respectively, with the identification mark of the penholder and handkerchief, and two index-cards provided with the identification mark of the plug sockets, have to be sent to those additional conveyers which have these goods in the appertaining shelves. On these cards is marked—for instance through printing of the number—the index number of the appertaining collecting receptacle 2 on the main conveying band. With the aid of these cards the employees are then enabled to place the ordered articles into the appertaining compartment of the additional conveyer, which with its compartments is constantly passing, with the result that all of the four ordered articles collect in the appertaining receptacle on the main conveying band. In order to avoid mistakes and to forcibly keep the employees in accord with the cycles of the plant, it is possible—when the decimal system is employed as classifying system—to periodically change the color of the identification stamp, for instance each time after a hundred group. In this way the field of search during the charging is also optically marked off, particularly then when simultaneously also the tabulator indication is effected with the aid of similar colors. To enable a speedy treatment of the incoming orders, it is advisable to use order-sheets on which the address and other data of the customer are entered for instance on the upper portion, while the ordered articles are entered on the lower portion, so that both portions can easily be separated. This makes it possible for the employees to attend—for the sake of the speedy handling of the orders—simultaneously to the work concerning the data of the customer, and to the work regarding the gathering of the articles from the stocks and for the packing up of the parcels. In order to facilitate the subsequent reunion of the two portions and of the means prepared for the execution of the order—parcel, address-card, label etc.—it is advisable to print upon each of the aforesaid two order-portions, prior to their separation from each other, the number of the collection or the like.

The aforesaid goods-cheques for the articles appertaining to a collection and to be fed into the compartments of the additional conveyors, can be assorted according to the various types of goods represented by them and be arranged in boxes, from which they can be taken according to the orders received. It is possible to make the goods-cheques for goods of special kinds specially optically recognizable—for instance through different coloring—as a means of indication for a plurality of goods of similar kind. The goods-cheques are provided at a suitable place with a blank, on which is stamped the number of the collection, which then is used by the employees as identifying means for feeding the ordered articles into the compartments of the additional conveyers.

The nature of the invention will not be changed when in suitable cases the charging of the compartments of the additional conveyors is not effected by hand, but mechanically by means of slide-ways, gripping means or the like.

What we claim as new and desire to secure by Letters Patent of the United States is:

1. A conveyer system comprising a main conveyer, a plurality of feeder conveyers disposed at an angle and substantially transversely to said main conveyer, and a plurality of individual goods holding means mounted on each of said feed conveyers, each of said feeder conveyers having a portion adjacent to said main conveyer, said portions of said feeder conveyers being spaced in the direction of movement of said main conveyer, for transferring the goods held in said holding means to said main conveyer in a predetermined pattern, said main conveyer being substantially horizontal, and said feeder conveyers being above said main conveyer and individually including endless belts having substantially vertical runs.

2. A conveyer system comprising a main conveyer, a plurality of feeder conveyers disposed at an angle and substantially transversely to said main conveyer, and a plurality of individual goods holding means mounted on each of said feeder conveyers, each of said feeder conveyers having a portion adjacent to said main conveyer, said portions of said feeder conveyers being spaced in the direction of movement of said main conveyer, for transferring the goods held in said holding means to said main conveyer in a predetermined pattern, said main conveyer being divided into a plurality of spaced parallel band conveyers, and said feeder conveyers being divided into a plurality of spaced conveyers and placed for individual cooperation with the band conveyers of said main conveyer.

3. A conveyer system comprising a main conveyer, a plurality of feeder conveyers disposed at an angle and substantially transversely to said main conveyer, a plurality of individual goods holding means mounted on each of said feeder conveyers, each of said feeder conveyers having a portion adjacent to said main conveyer, said portions of said feeder conveyers being spaced in the direction of movement of said main conveyer, for transferring the goods held in said holding means to said main conveyer in a predetermined pattern, and a plurality of receptacles placed on said main conveyer in rows transversely to the direction of movement of said main conveyer, said goods holding means being disposed on said feeder conveyers in rows extending transversely to the direction of movement of said feeder conveyers and parallel to the rows of receptacles on said main conveyer.

4. A conveyer system according to claim 3, in which the number of said receptacles in each row corresponds to the number of goods holding means in each row.

5. A conveyer system according to claim, 4 in which the number of receptacles and the number of goods holding means in each row are divisible by ten.

6. A conveyer system according to claim 4, in which the number of rows of receptacles on said main conveyer and the number of rows of goods holding means on said feeder conveyers are divisible by ten.

7. A conveyer system according to claim 4, in which the number of rows of receptacles on said main conveyer and the number of rows of goods holding means on said feeder conveyers are multiples of the radix of a numerical system.

8. A conveyer system according to claim 3, in which said goods holding means and said receptacles consist of individual boxes open at the top.

9. A conveyer system according to claim 3, in which said feeder conveyers include conveyer bands to which said goods holding means are rigidly connected and in which said receptacles are unmovable with respect to each other.

10. A conveying system as specified in claim 3, in which said main conveyor consists of a roller path on which said receptacles are slidingly arranged.

11. A conveying system as specified in claim 3, including a roller path arranged at one end of said main conveyor and onto which said plurality of receptacles are slidingly transferred for further conveyance.

References Cited in the file of this patent
UNITED STATES PATENTS

| | | |
|---|---|---|
| 1,711,647 | Milmoe | May 7, 1929 |
| 2,061,490 | Thompson et al. | Nov. 17, 1936 |
| 2,071,771 | Shield | Feb. 23, 1937 |
| 2,408,838 | Wilckens et al. | Oct. 8, 1946 |
| 2,584,628 | Skillman | Feb. 5, 1952 |
| 2,642,010 | Zimma | June 16, 1953 |